Oct. 25, 1966    J. HUGHSON    3,281,671
DEVICE HAVING A SEMI-CYLINDRICAL TUBE STEM RECEIVING RECESS
FOR TESTING FILAMENT CONTINUITY IN ELECTRON TUBES
Filed July 31, 1963
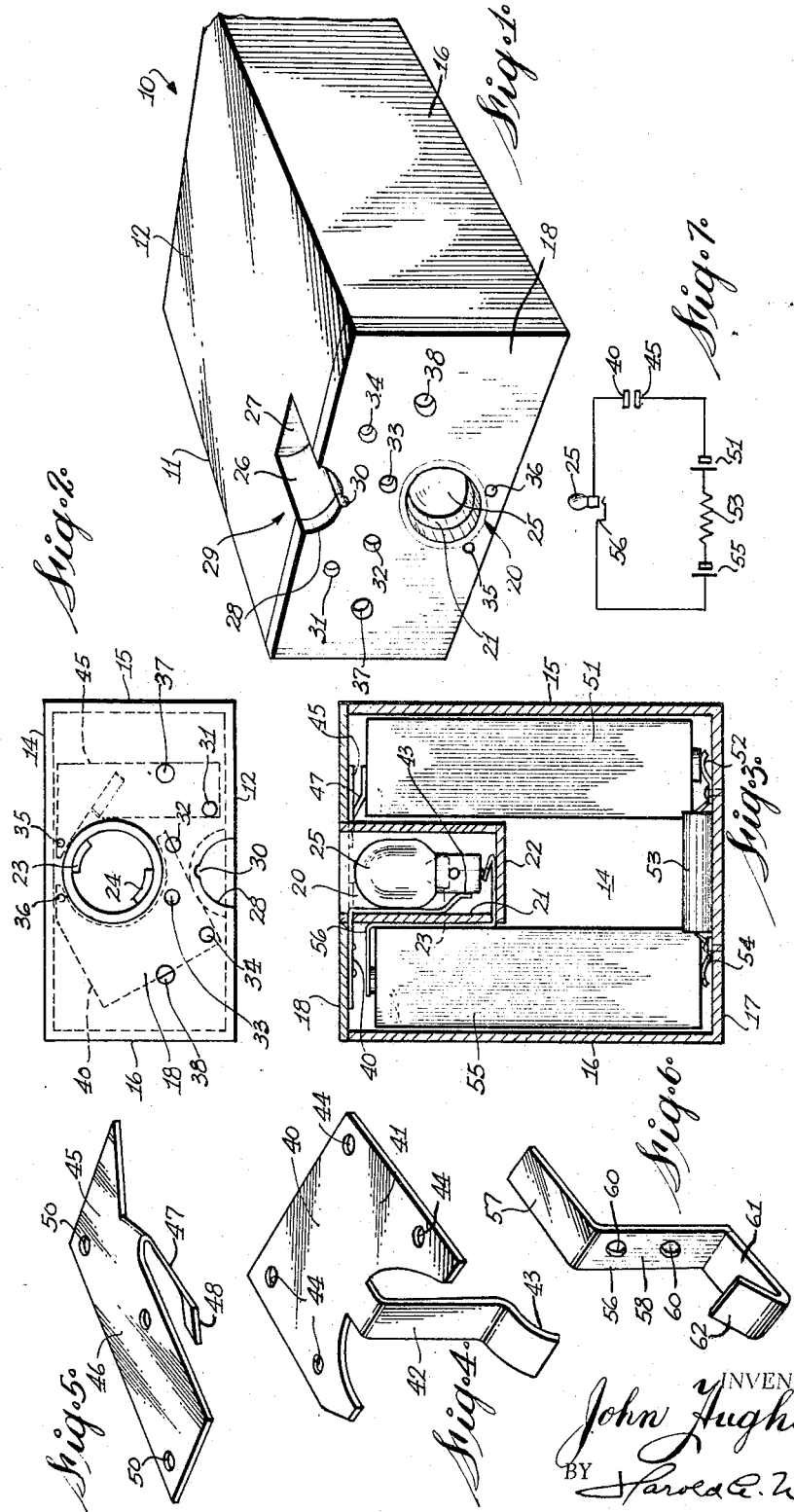
INVENTOR
John Hughson
BY Harold A. Weir
PATENT AGENT

United States Patent Office 3,281,671
Patented Oct. 25, 1966

3,281,671
DEVICE HAVING A SEMI-CYLINDRICAL TUBE STEM RECEIVING RECESS FOR TESTING FILAMENT CONTINUITY IN ELECTRON TUBES
John Hughson, 363 Dieppe St., London, Ontario, Canada
Filed July 31, 1963, Ser. No. 298,863
Claims priority, application Canada, Nov. 7, 1962, 861,866
2 Claims. (Cl. 324—51)

This invention relates to an electrical testing device, and in particular, it relates to a portable device for testing electrical continuity.

The increased use of electrical equipment in homes has made it desirable to have some simple, portable means for testing the equipment when it does not operate properly. One common cause of failure in electrical equipment is an open circuit or lack of continuity in the electrical circuit concerned. This is particularly the case in radio and television receivers where the failure of the receiver is frequently the result of the failure of a filament or heater in a component electron tube. Accordingly, if the continuity of the filaments of electron tubes could readily be tested by a simple device, tubes with defective filaments could be easily replaced.

This invention is for a device of simple, straight-forward and inexpensive construction that is particularly adapted for testing the continuity of filaments of receiving tubes. The device is, however, readily adapted for testing the continuity of fuses and other electrical equipment.

It is, therefore, an object of this invention to provide an electrical testing device of novel design for testing electrical continuity.

It is another object of this invention to provide means for testing the filaments of electron tubes which is simple in construction and economical of manufacture.

These and other objects of the invention will become apparent from the following detailed description taken in conjunction with the accompanying drawings in which, FIGURE 1 is an isometric view of the testing device of the invention, FIGURE 2 is a top view of the device, FIGURE 3 is a sectional view of the device showing the batteries and lamp bulb in position, FIGURES 4, 5 and 6 are isometric views of components of the device drawn to a larger size for better understanding, and FIGURE 7 is a schematic wiring diagram illustrating a suitable circuit for the device.

Briefly, the invention is for a testing device particularly for testing filament continuity in electron tubes, comprising an insulative casing including first and second side walls meeting substantially at right angles to form a corner, the first wall having a substantially semi-circular indentation extending inwardly from said corner froming a curved edge portion to the first wall, the second wall having in a portion thereof a substantially semi-cylindrical curved portion forming a depression therein, the transverse extent of the surface of the curved portion of the second wall being coextensive with the curved edge portion of the first wall, the curved edge portion of the first wall and the curved portion of the second wall forming a substantially semi-cylindrical tube stem receiving recess, the first wall being provided with a plurality of tube pin receiving apertures spaced around the semi-circular edge portion, a lamp socket in said casing, a first conductive plate secured within the casing having portions intersecting axial projections of pedetermined ones of said apertures and having an arm extending into the lamp socket forming a first lamp contact, a second conductive plate secured within the casing having portions intersecting axial projections of predetermined other ones of said apertures and having an arm extending therefrom forming a first battery contact, a second lamp contact in said lamp socket, a second battery contact spaced from said first battery contact, and circuit means conductively connecting the second battery contact and the second lamp contact.

Referring now to the drawing, the reference number 10 designates generally a tester according to the invention. The tester 10 has a casing 11 formed of any suitable electrically insulative material, such as, for example, any of the suitable commercially available synthetic plastic materials. The casing 11 comprises side walls 12 and 14, end walls 15 and 16, bottom wall 17 and removable cover 18. The casing 11 is shown as having walls 12, 14, 15, 16 and 17 integrally formed, however, the casing could be made of any number of parts formed or secured together as convenient.

In the cover 18 a recess 20 is provided having a cylindrical side wall 21 and a bottom 22 formed to provide a lamp socket. Two oppositely disposed retaining lugs 23 and 24 in wall 21 serve to retain a lamp bulb in position. FIGURE 3 shows a lamp bulb 25 in position in the socket.

The casing 11 has a substantially semi-cylindrical recess 29 in side wall 12 comprising a curved wall portion 26 and a flat terminal wall portion 27. The recess terminates at the end opposite wall 27 in a substantially semi-circular edge 28 in cover 18. In other words, the recess 29 extends through cover 18 a predetermined distance along wall 12. This recess 29 is adapted to receive the stem of an eight pin receiving tube and its curvature and length are so chosen. It will be apparent that the recess 29 need not be exactly half a cylinder in form, but may be either more or less than half a cylinder as long as it serves to locate a tube stem with respect to the casing for testing of the tube. To aid in orienting the tube to be tested with certain of its pins in a desired position, a tube positioning slot or keyway 30 may be located in the curved wall 26 of the recess 29.

The cover 18 has four tube pin receiving apertures 31, 32, 33 and 34, spaced around edge 28 in position to receive the pins of a tube as its stem is oriented and inserted in the stem receiving recess. The apertures 31, 32, 33 and 34, as shown, would receive pins 7, 8, 1 and 2, respectively, of a tube oriented by keyway 30, as shown. Also, in cover 18 are two apertures 35 and 36 adapted to receive pins of a seven pin and nine pin miniature tube for testing, and apertures 37 and 38 adapted to receive the pins of a pair of test leads. The apertures will be discussed again hereinafter.

Secured to cover 18 within the casing 11 are two conductive plates. The term "plates" is used to mean that the material is relatively thin and comprises mainly flat portions. The conductive plates may be of any sheet metal material having good electrical conductivity.

The first of these conductive plates is plate 40, shown in detail in FIGURE 4 as if removed from a finished device. It comprises a main portion 41 and an arm 42 extending therefrom approximately at right angles with a curved lip 43 at the end of arm 42. Preferably, the lip 43 at least of arm 42 is flexible to form a lamp contact. The main portion 41 may have apertures 44 to facilitate fastening the plate 40 to cover 18. The location in which plate 40 is mounted can be seen in FIGURES 2 and 3. The main portion 41 is adjacent cover 18 so that portions intersect axial projections of apertures 32, 33, 34, 36 and 38. If desired, tthe main portion 41 may be spaced from cover 18 so that pins may be inserted a greater distance through the associated apertures. The arm 42 of plate 40 passes through the side wall 21 of recess 20 and extends along wall 21 part way towards bottom wall 22 where lip 43 is located forming a lamp contact. FIGURE 3 shows lip 43 engaging lamp bulb 25.

The second of the conductive plates is plate 45, shown in detail in FIGURE 5 as if removed from a finished device. It comprises a main portion 46 and an arm 47 bent to extend under main portion 46 with a lip or end portion 48 forming a battery contact. Preferably, arm 47 should be flexible, at least in part, to ensure good engagement with a terminal of a battery. It should be noted here that the word "battery" is used in a general sense to include one or more battery cells, and the term "battery contact" is used to mean an electric contact adapted to engage a terminal of a battery cell or a battery of a plurality of cells. The main portion 46 of plate 45 may have apertures 50 to facilitate fastening of plate 45 to cover 18. The location in which plate 45 is mounted can be seen in FIGURES 2 and 3. The main portion 46 is adjacent cover 18 so that portions intersect axial projections of apertures 31, 35 and 37. As before, the main portion 46 may be spaced from cover 18 to permit pins to be inserted farther in to the associated apertures. As shown, in FIGURE 3, the tip or end 48 of arm 47 engages a terminal of a battery 51.

The opposite terminal of battery 51 engages a battery contact 52 (see FIGURE 3) which, in turn, is connected to one side of a current reducing resistance 53. The other side of resistance 53 is connected to a battery contact 54 which engages one terminal of a battery 55. The other terminal of battery 55 engages yet another conductive plate or conductive strip 56 which is shown in detail in FIGURE 6 as if removed from a completed device.

Referring to FIGURE 6, plate 56 has a portion 57 forming a battery contact, a center portion 58 having apertures 60 to facilitate fastening of plate 56 to the casing 11, and a portion 61 projecting from center portion 58 approximately at right angles with a tip 62 bent back over portion 61 to form a lamp contact.

The location of conductive plate 56 within casing 11 can be seen in FIGURE 3. Plate 56 has its center portion 58 secured to curved wall 21 of recess 20 with portion 57 projecting over battery 55 and engaging a terminal thereof. Portion 61 of plate 56 projects through wall 21 of recess 20 and along wall 22 where tip 62 is bent to form a lamp contact. It will be apparent that at least portions 57 and 61 of plate 56 should be flexible to make good contact with the respective battery and lamp terminals.

Referring now to FIGURE 7, there is shown a schematic wiring diagram suitable for the device. Plates 40 and 45 represent the exposed or end terminals of the device. From plate 40 there is a series circuit through lamp 25, plate 56, battery 55, resistance 53 and battery 51 to plate 45. Any low impedance connected across plates 40 and 45 will result in lamp 25 being energized. This, of course, indicates continuity in the tube filament, circuit or electrical apparatus being tested. It will be apparent to those skilled in the art that a suitable selection of batteries 51 and 55 and of lamp 25 could make it unnecessary to have resistance 53 in the circuit. The purpose of resistance 53 is to reduce the current through bulb 25 slightly below its rated value and thus prolong the life of the bulb.

When the testing device 10 is used to test the continuity of the tube filaments, the tube is arranged so that the pins of the tube connected to the filament contact plates 40 and 45, thus connecting the filament across these plates. It will be recalled that apertures 31, 32, 33 and 34, will receive pins 7, 8, 1 and 2, respectively, of a standard octal base receiving tube when oriented or positioned by keyway 30. In a majority of these receiving tubes the filaments of the tubes are connected either between pins 7 and 8 or between pins 2 and 7. If it is pins 7 and 8 that are connected to the filament or heater, then pin 7 contacts plate 45 through aperture 31, and pin 8 contacts plate 40 through aperture 32. If it is pins 2 and 7 that are connected to the tube filament, then pin 2 contacts plate 40 through aperture 34, and pin 7 contacts plate 45 through aperture 31. Thus, the majority of filaments are checked in eight pin tubes by simply inserting the tube oriented by recess 29 and keyway 30. No switching or selecting a proper orientation is required.

Similarly, when testing seven pin and nine pin miniature tubes, the apertures 35 and 36 are used. A seven pin miniature tube is oriented and, for example, pin 3 inserted through aperture 36 to contact plate 40 while pin 4 is inserted through aperture 35 to contact plate 45. Likewise, these holes or apertures 35 and 36 may receive, for example, pins 5 and 4 of a nine pin miniature tube. Apertures 37 and 38 are adapted to receive terminal pins of test leads (not shown) which may be used to test continuity of filaments of other tubes, fuses, circuits or the like.

It will be seen that the testing device according to the invention is simple to manufacture. There is little wiring involved as the contacts and interconnections are largely made by three conductive plates. The batteries are readily replaced by removing the cover. The tester may be made relatively small because the tube stem receiving recess with its adjacent tube pin receiving apertures eliminate the need for a full socket for the tube. The device tests for the continuity of tube filaments and the like quickly and simply.

I claim:

1. An electrical testing device for testing filament continuity in electron tubes comprising an insulative casing including first and second walls meeting substantially at right angles to form a corner, said first wall having a substantially semi-circular indentation extending inwardly from said corner forming a curved edge portion to said first wall, said second wall having in a portion thereof a substantially semi-cylindrical curved portion forming a depression therein, the transverse extent of the surface of the curved portion of said second wall being coextensive with the curved edge portion of said first wall, said curved edge portion of said first wall and said curved portion of said second wall forming a substantially semi-cylindrical tube stem receiving recess, said first wall being provided with a plurality of tube pin receiving apertures spaced around said curved edge portion, a lamp socket in said casing, a first conductive plate secured within said casing having portions intersecting axial projections of predetermined ones of said apertures and having an arm extending into said lamp socket forming a first lamp contact, a second conductive plate secured within said casing having portions intersecting axial projections of predetermined other ones of said apertures and having an arm extending therefrom forming a first battery contact, a second lamp contact in said lamp socket, a second battery contact spaced from said first battery contact, and circuit means conductively connecting said second battery contact and said second lamp contact.

2. An electrical testing device for testing filament continuity in electron tubes comprising an insulative battery holding casing having two side walls, two end walls, a bottom wall and a removable cover, said casing having a first recess located in said cover forming a lamp socket, one of said side walls and said cover meeting at a first corner, said cover having a substantially semi-circular indentation extending inwardly from said first corner forming a substantially semi-circular edge portion in said cover, said one of said side walls having in a portion thereof adjacent said first corner a substantially semi-cylindrical curved portion forming a depression therein, the transverse extent of the surface of the curved portion of said one of said side walls being coextensive with said semi-circular edge portion in said cover, said edge portion in said cover and said curved portion of said one of said side walls forming a substantially semi-cylindrical tube stem receiving second recess, said cover being provided with a plurality of tube pin receiving apertures spaced around said semi-circular edge portion, a longitudinally extending tube positioning slot in said curved portion of said one of said side walls, a first conductive plate within said casing secured to and adjacent said cover having portions intersecting axial projections of predetermined ones of said apertures and having an arm with a flexible end portion extending into said lamp socket forming a first lamp contact, a second conductive plate within said casing secured to and adjacent said cover having portions intersecting axial projections of predetermined other ones of said apertures and having an arm with a flexible end portion extending therefrom forming a first battery contact, a second battery contact on the bottom wall of said casing opposite said first battery contact, a third battery contact on the bottom wall of said casing spaced from said second battery contact, a current reducing resistance connected between said second and third battery contacts, and a third conductive plate having an arm with a flexible end portion extending into said lamp socket forming a second lamp contact and having another arm with a flexible end portion forming a fourth battery contact positioned opposite said third battery contact.

References Cited by the Examiner

UNITED STATES PATENTS

| | | | |
|---|---|---|---|
| 1,736,605 | 11/1929 | Kreft | 324—51 |
| 1,945,802 | 2/1934 | Daley | 324—22 X |
| 2,881,385 | 4/1949 | Smith | 324—22 |
| 3,047,798 | 7/1962 | Winslett | 324—53 |

FOREIGN PATENTS 928,209   11/1947   France.

WALTER L. CARLSON, *Primary Examiner.*

G. R. STRECKER, *Assistant Examiner.*